(12) United States Patent
Sato

(10) Patent No.: US 11,574,156 B2
(45) Date of Patent: Feb. 7, 2023

(54) IMAGE FORMING APPARATUS, IMAGE FORMING METHOD, AND STORAGE MEDIUM

(71) Applicant: CANON KABUSHIKI KAISHA, Tokyo (JP)

(72) Inventor: Eri Sato, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/382,792

(22) Filed: Jul. 22, 2021

(65) Prior Publication Data
US 2022/0036143 A1 Feb. 3, 2022

(30) Foreign Application Priority Data
Jul. 29, 2020 (JP) .............................. JP2020-128060

(51) Int. Cl.
*G06K 15/02* (2006.01)
*G06F 3/12* (2006.01)
*G06K 15/00* (2006.01)

(52) U.S. Cl.
CPC ......... *G06K 15/027* (2013.01); *G06K 15/002* (2013.01); *G06K 15/1803* (2013.01); *G06K 15/1878* (2013.01); *G06K 15/408* (2013.01)

(58) Field of Classification Search
None
See application file for complete search history.

(56) References Cited

U.S. PATENT DOCUMENTS

| 2015/0168901 A1* | 6/2015 | Yasuda | G03G 15/55 399/72 |
| 2019/0238685 A1* | 8/2019 | Tsukamoto | H04N 1/00074 |
| 2020/0166882 A1* | 5/2020 | Yamashita | G03G 15/5062 |

FOREIGN PATENT DOCUMENTS

| JP | 2004276379 | * 10/2004 | ............... H04N 1/23 |
| JP | 2007295488 | * 11/2007 | ............... H04N 1/00 |
| JP | 2012-147210 A | 8/2012 | |

* cited by examiner

*Primary Examiner* — Beniyam Menberu
(74) *Attorney, Agent, or Firm* — Canon U.S.A., Inc. IP Division

(57) ABSTRACT

An apparatus outputs a first number of printed materials, reads the first number of printed materials output to acquire the first number of pieces of scanned image data, the first number being two or more, and controls a density of output printed materials by calculating variations in lightness values in the respective pieces of scanned image data included in scanned image data groups for each scanned image data group having as a unit a second number of pieces of scanned image data consecutive in order of being read among the first number of pieces of scanned image data, the second number being two or more, so that the printed materials are further output until all the variations in the lightness values are less than a first threshold value.

17 Claims, 6 Drawing Sheets

FIG.4

| FIG.4A |
|--------|
| FIG.4B |

FIG.4A

START PRINTING OF DENSITY ADJUSTMENT CHART

↓

S401 — RECEIVE DESIGNATION OF NUMBER OF SHEETS FOR WARM UP PRINTING FROM USER

↓

S402 — PRINT DESIGNATED NUMBER OF SHEETS OF DENSITY ADJUSTMENT CHARTS

↓

S403 — HAS ADJUSTMENT CHART READ START INSTRUCTION BEEN RECEIVED FROM USER?
- NO → (loop back to S403)
- YES ↓

S404 — READ ALL ADJUSTMENT CHARTS PLACED ON ADF

↓

S405 — STORE LIGHTNESS OF PREDETERMINED PATCH IN READ CHART

↓

S409 — NUMBER OF PRINT SHEETS < N?
- NO → (back to S402)
- YES ↓

S410 — IS STANDARD DEVIATION OF EACH PATCH LIGHTNESS LESS THAN SECOND THRESHOLD VALUE?
- NO → (back to S402)
- YES ↓

IMAGE FORMING APPARATUS, IMAGE FORMING METHOD, AND STORAGE MEDIUM

BACKGROUND OF THE DISCLOSURE

Field of the Disclosure

The aspect of the embodiments relates to an automatic density adjustment function of an image forming apparatus.

Description of the Related Art

In an image forming apparatus, the density and position of an image on a printed material to be output change due to changes in a usage environment and changes over time of a machine body. Therefore, some image forming apparatuses have the function of performing various adjustments such as a density adjustment and a position adjustment based on a print result. Japanese Patent Laid-Open No. 2012-147210 discloses a technique relating to an automatic density adjustment in which an image forming apparatus equipped with a scanner such as a multifunction device reads a printed material output by the image forming apparatus and corrects an image density based on the density of an image on the read printed material.

However, in Japanese Patent Laid-Open No. 2012-147210, although the output printed material is read and printing failures and reading errors are determined to perform a density adjustment, since the state of a machine body changes before and after the adjustment in a case where the machine body is not in a stable state capable of high-quality printing, there is an issue that the quality is not stable. In order to stabilize the state of the machine body, it is sufficient to perform warm up printing by performing printing in advance. However, there is an issue that in order to surely stabilize the machine body without grasping the state of the machine body, the warm up printing is to be performed more.

SUMMARY OF THE DISCLOSURE

An apparatus comprising: a forming unit configured to output a first number of printed materials on which an image for performing a density adjustment is formed; a reading unit configured to read the first number of printed materials output from the forming unit to acquire the first number of pieces of scanned image data, the first number being two or more; and a control unit configured to control the forming unit by calculating, for each scanned image data group having as a unit a second number of pieces of scanned image data consecutive in order of being read among the first number of pieces of scanned image data, variations in the lightness values of a predetermined number of specific pixels in respective pieces of scanned image data included in each scanned image data group, the second number being two or more so that the printed materials are further output until all the variations in the lightness values of the predetermined number of specific pixels are less than a first threshold value.

Further features of the disclosure will become apparent from the following description of exemplary embodiments with reference to the attached drawings.

BRIEF DESCRIPTION OF THE DRAWINGS

FIG. 4 is a diagram representing a relationship between FIGS. 4A and 4B;

FIGS. 4A and 4B are a flow chart in printing the adjustment chart in the image forming apparatus according to the present embodiment;

DESCRIPTION OF THE EMBODIMENTS

A description of an embodiment for carrying out a technique of the present disclosure will be given below with reference to drawings.

Figure 1:
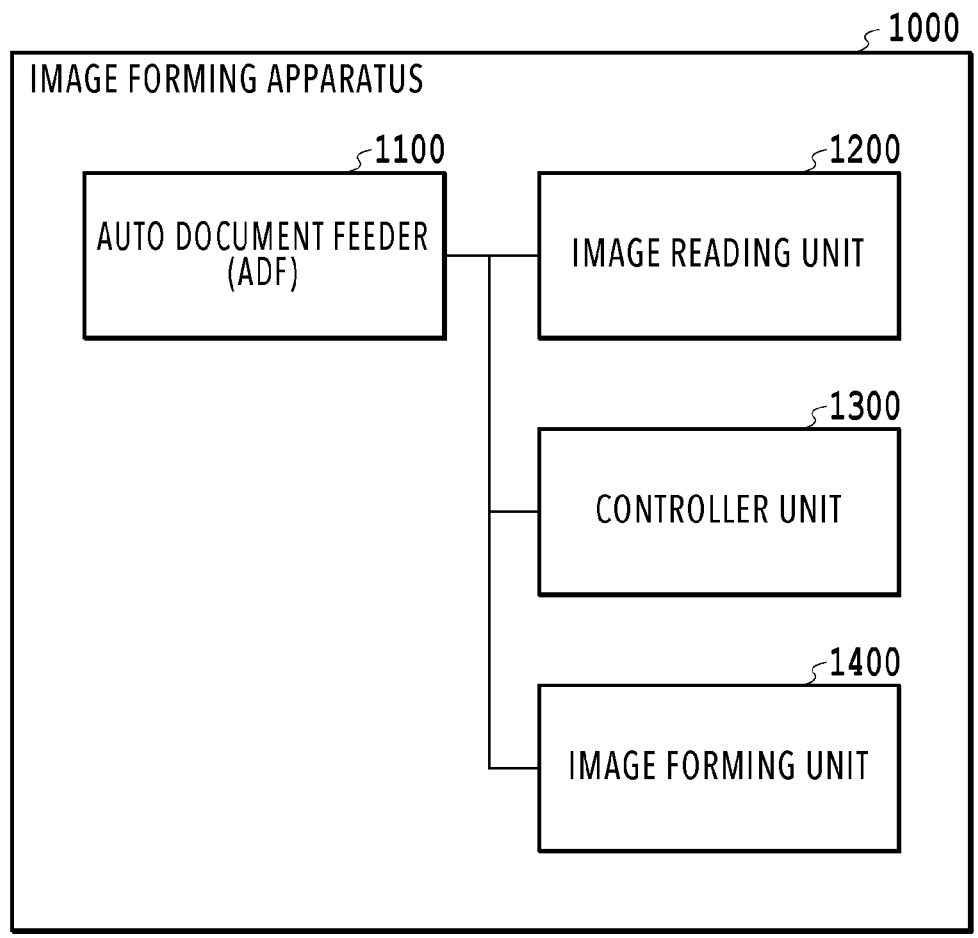
FIG. 1 is a block diagram showing a configuration of an image forming apparatus according to the present embodiment.

FIG. 1 is a block diagram showing an overall configuration of an image forming apparatus 1000 of the present embodiment.

An auto document feeder (ADF) 1100 sends and receives a control signal to and from an image reading unit 1200 via a data bus to convey a document placed on a document installation tray and perform notification of the values of various sensors including a document detection sensor.

The image reading unit 1200 reads the document in cooperation with the ADF 1100 according to a document read instruction received from the controller unit 1300 via the data bus.

The controller unit 1300 controls the entire image forming apparatus 1000 including the ADF 1100, the image reading unit 1200, and the image forming unit 1400 via the data bus. Further, the controller unit 1300 analyzes PDL data input to the image forming apparatus 1000 and image data acquired by the image reading unit 1200 and appropriately performs image processing to generate image data to be output to the image forming unit 1400.

The image forming unit 1400 conveys recording paper, forms an image thereon based on the image data acquired from the controller unit 1300 via the data bus, and discharges a printed material to the outside of the apparatus.

Figure 2:
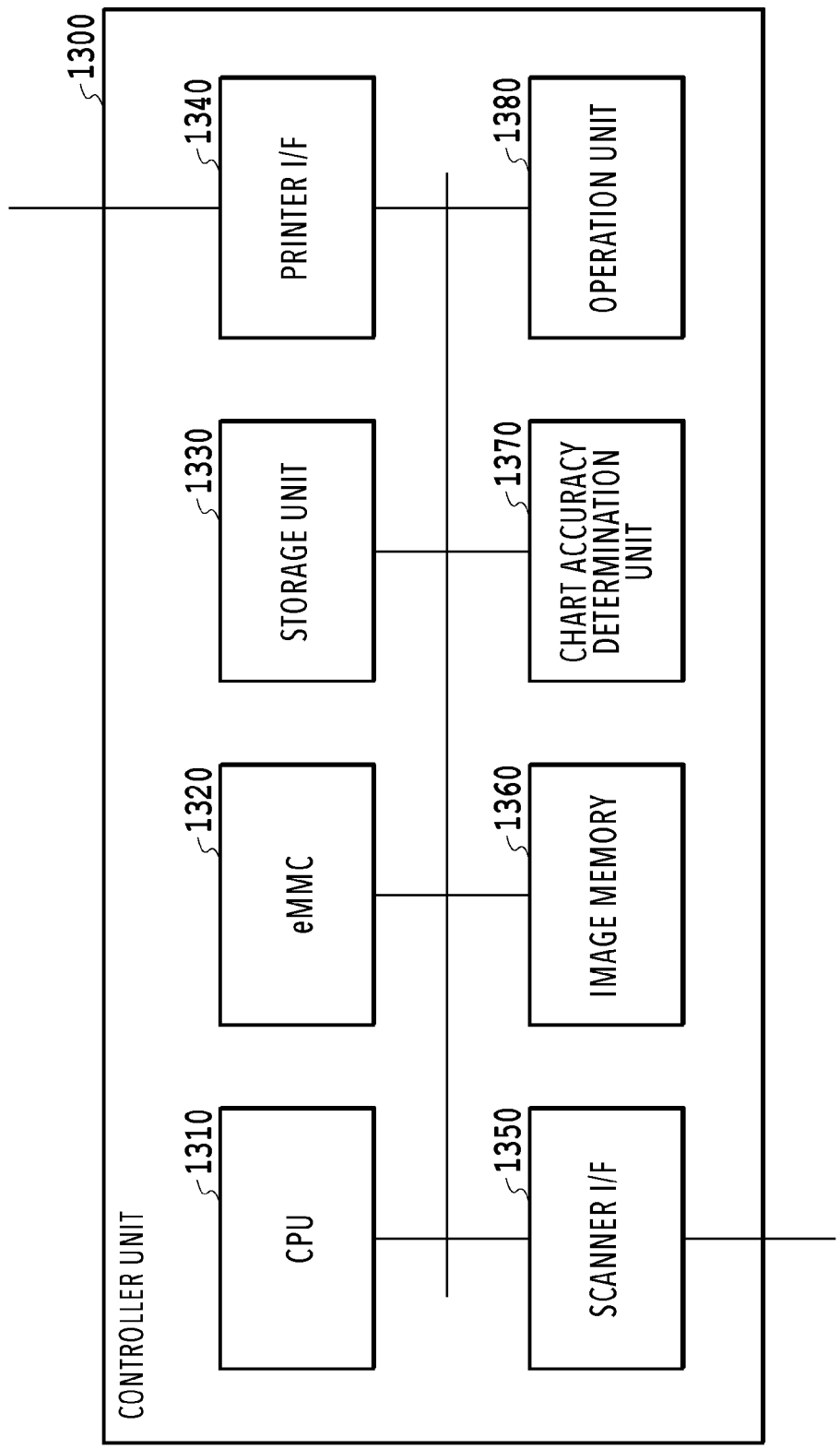
FIG. 2 is a block diagram showing a detailed configuration of a controller unit 1300 of the image forming apparatus according to the present embodiment.

A description of a detailed configuration of the controller unit 1300 will be given below with reference to FIG. 2.

The controller unit 1300 is a control unit of the image forming apparatus 1000 and includes a CPU 1310 that controls the entire image forming apparatus 1000. The controller unit 1300 further includes an eMMC 1320 which is a storage device using a flash memory storing a control program of the CPU 1310 and a storage unit 1330 which is a non-volatile memory for holding programs and various types of data necessary for various controls. The controller unit 1300 further includes a printer I/F 1340 for transmitting and receiving data to and from the image forming unit 1400 and a scanner I/F 1350 for transmitting and receiving data to and from the image reading unit 1200. The controller unit 1300 further includes an image memory 1360 for storing image data acquired through the scanner I/F 1350 and a chart accuracy determination unit 1370 for determining a chart accuracy by analyzing lightness from an adjustment chart image stored in the image memory 1360. The controller unit 1300 further includes an operation unit 1380 provided with a touch panel and a hardware key for presenting information to a user or accepting operations such as a job input and various settings.

Here, consideration will be given of the case of printing image data of a chart for density adjustment in the image forming apparatus 1000 described above.

Figure 3:
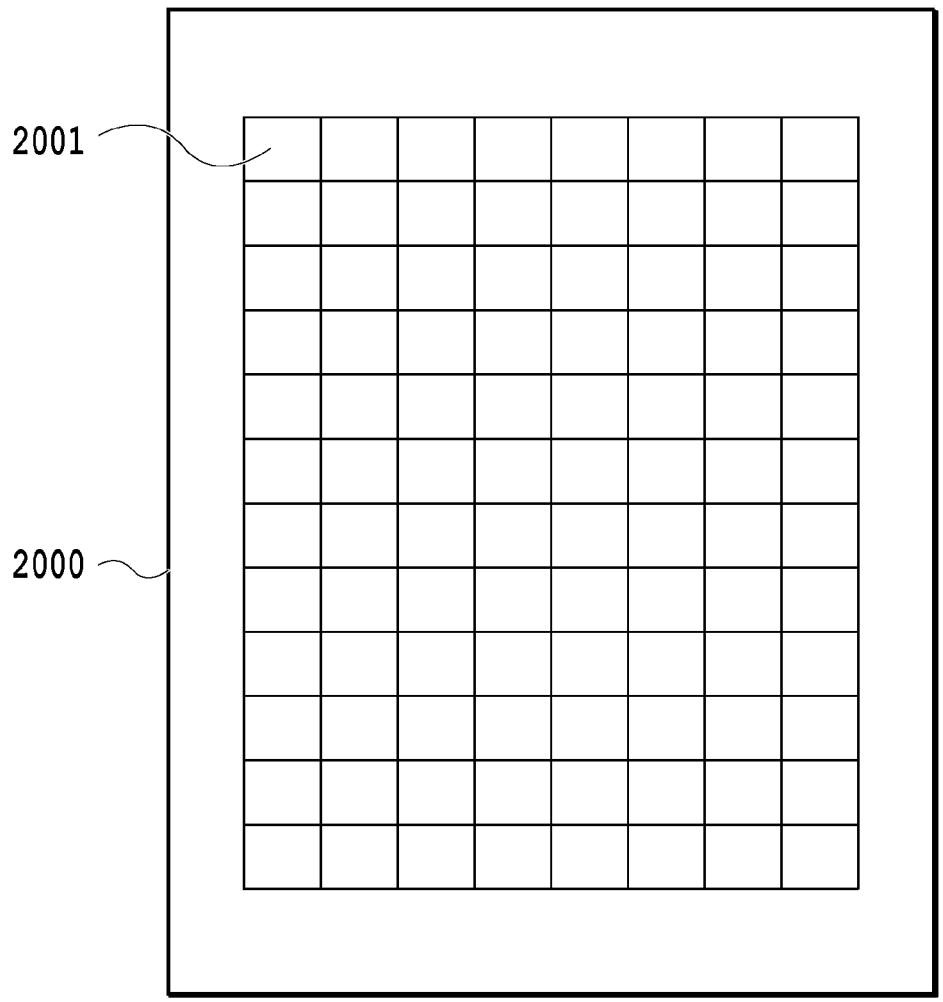
FIG. 3 is a schematic view of an adjustment chart.

FIG. 3 is a schematic view of an adjustment chart 2000. A plurality of patches 2001 filled with a specific color at a specific density are arranged in the adjustment chart 2000. In FIG. 3, 8×12 patches 2001 are arranged as an example. A combination of the position, color, and density of each patch 2001 and image data of the adjustment chart 2000 based on the combination are stored in the storage unit 1330 in advance. In the combination of the color and density of each patch 2001, each color of YMCK gradually changes from a low density to a high density. Incidentally, in the case of performing an adjustment for monochrome printing, a single color such as black changes from a low density to a high density in each patch 2001.

The image data of the adjustment chart 2000 stored in the storage unit 1330 is sent to the image forming unit 1400 via the printer I/F 1340 and is printed on the recording paper by the image forming unit 1400.

In a case where the image forming apparatus 1000 receives the user's setting of the number of sheets for warm up printing of the adjustment chart 2000 and the input of a print start instruction from the operation unit 1380, the image forming apparatus 1000 starts printing the adjustment chart 2000. Warm up printing is for stabilizing operation conditions (the state of the machine body) such as a temperature inside the machine body of the image forming apparatus 1000 and charging due to friction by printing a plurality of sheets of the same adjustment chart 2000 before printing the adjustment chart 2000 to be used for an actual adjustment. The purpose of the warm up printing is to improve the quality of a print result of the adjustment chart 2000 used for an adjustment and to improve the quality of a printed material after the adjustment. The image used for warm up printing is not limited to the adjustment chart 2000 to be used for the actual adjustment and may be any image including a color used in the adjustment chart 2000.

Figure 4B:
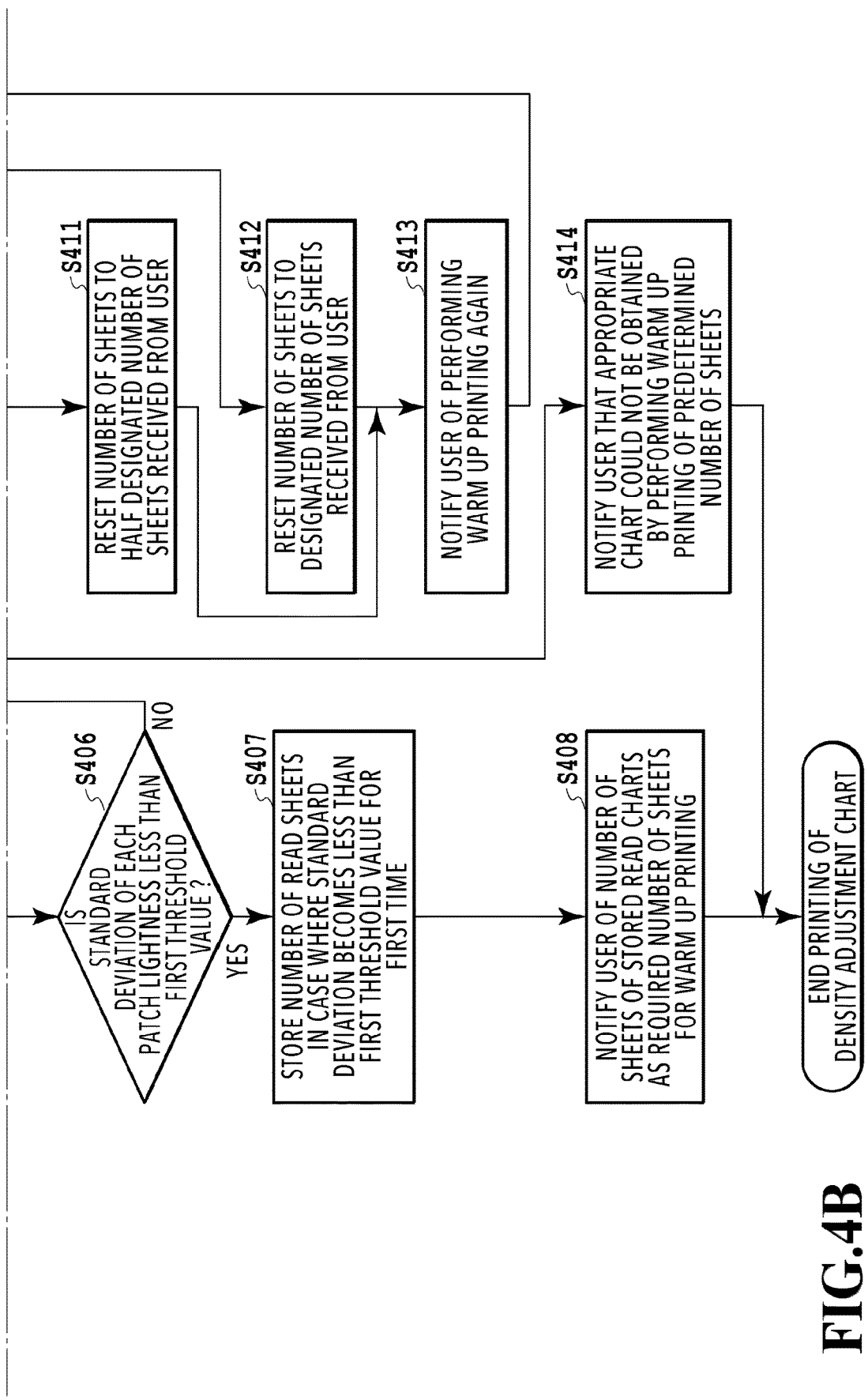

FIG. 4 shows a flowchart for explaining a basic flow of warm up printing in performing the density adjustment in the image forming apparatus 1000 according to the present disclosure. A program for implementing the warm up printing shown in the present flowchart is stored in the storage unit 1330, and after once read by the eMMC 1320, the program is executed by the CPU 1310.

<Processing from Printing the Adjustment Chart to Comparing the Standard Deviation of Each Patch with a First Threshold Value>

The controller unit 1300 receives from the user the setting of the number of sheets for warm up printing of the adjustment chart 2000 and the input of the print start instruction with the operation unit 1380, and stores the acquired designated value of the number of print sheets in the storage unit 1330. Further, the controller unit 1300 transmits the image data of the adjustment chart 2000 acquired from the storage unit 1330 and the designated value of the number of print sheets from the printer I/F 1340 to the image forming unit 1400 to give a print instruction (S401).

The image forming unit 1400 receives a print instruction from the controller unit 1300 and prints the image data of the adjustment chart 2000 received together with the print instruction on the designated number of print sheets of recording paper (S402).

The controller unit 1300 waits for the user to input an adjustment chart reading start instruction from the operation unit 1380 after placing on the ADF 1100 the designated number of the output printed materials of the adjustment chart 2000, the designated number being designated by the image forming unit 1400 (S403).

In a case where the controller unit 1300 receives the input of the adjustment chart reading start instruction from the user at the operation unit 1380, the controller unit 1300 transmits an image reading instruction to the ADF 1100 and the image reading unit 1200 via the scanner I/F 1350. After receiving the image reading instruction, the image reading unit 1200 reads all the printed materials of the adjustment chart 2000 conveyed from the ADF 1100 and transmits the read scanned image data to the controller unit 1300 via the scanner I/F 1350 (S404).

The controller unit 1300 stores the scanned image data of the adjustment chart 2000 acquired via the scanner I/F 1350 in the image memory 1360 in association with reading order. Further, the controller unit 1300 stores the lightness value of a pixel corresponding to each patch of the scanned image data stored in the image memory 1360 in the storage unit 1330 based on the position information of patches in the adjustment chart 2000 stored in the storage unit 1330 (S405).

Based on the lightness value of each patch stored in the storage unit 1330, the controller unit 1300 calculates the standard deviation of the lightness value of each patch for each scanned image data group having, as a unit, a predetermined number of pieces of scanned image data consecutive in order of being read and stores the standard deviation in the storage unit 1330. The predetermined number which is the number of samples used to calculate the standard deviation is preferably, for example, about five, but may be a real number of two or more. The controller unit 1300 compares the maximum value among the standard deviations of the lightness values of respective patches calculated for each scanned image data group with the first threshold value stored in the storage unit 1330, and in a case where the standard deviation is less than the first threshold value, the process proceeds to S407, otherwise the process proceeds to S411 (S406). That is, in a case where all the standard deviations of the lightness values of respective patches are less than the first threshold value, the process proceeds to S407, and in a case where any of the standard deviations of the lightness values of respective patches is equal to or greater than the first threshold value, the process proceeds to S411. At this time, the first threshold value is a real number smaller than the second threshold value described later and equal to or greater than zero, and the second threshold value is a real number greater than the first threshold value.

The lightness value of each patch acquired in S405 and the standard deviation of the lightness value of each patch calculated in S406 do not necessarily need to be calculated for all patches in the adjustment chart 2000 and have only to be calculated for at least one or more specific patches.

Further, the standard deviation of the lightness value of each patch calculated in S406 does not necessarily need to be calculated from the scanned image data of all correction charts 2000 read by the image reading unit 1200. For example, it is possible to use a method of calculating the standard deviation only from the fifth and subsequent sheets discharged from the machine body of the image forming apparatus 1000 in an operating state which is expected to be stable.

Although a standard deviation is used in the present embodiment, another index may be used as long as it is an index showing variations in lightness values, and for example, variance may be used instead of the standard deviation.

<Processing in a Case where the Standard Deviation of Patch Lightness is Less than the First Threshold Value>

In a case where the maximum value among the standard deviations of the lightness values of respective patches calculated in the same sampling range is less than the first threshold value, a chart accuracy determination unit 1370 stores a sample number of a sheet which is read most recently in the storage unit 1330 as the number of print sheets whose standard deviation is less than the first threshold value (S407). For example, in a case where the maximum value among the standard deviations of the lightness values of the patches in the third to seventh sheets in the reading order is less than the first threshold value, the number of print sheets whose standard deviation is less than the first threshold value is stored as "7" in the storage unit 1330.

In a case where the number of print sheets whose standard deviation is less than the first threshold value is stored in S407, the controller unit 1300 displays the number of print sheets stored in the storage unit 1330 on the operation unit 1380 as the required number of sheets for warm up printing to notify the user (S408).

<Processing in a Case where the Standard Deviation of Patch Lightness is not Less than the First Threshold Value>

In a case where the maximum value among the calculated standard deviations in patch lightness is not less than the first threshold value, the controller unit 1300 compares the current number of print sheets with the maximum number of sheets for warm up printing N stored in the storage unit 1330. The maximum number of sheets for warm up printing N may be set in advance or may be set by acquiring a value input by the user via the operation unit 1380 before starting printing of the adjustment chart 2000. In a case where the current number of print sheets is less than the maximum number of sheets for warm up printing N, the process proceeds to S410, and in a case where the current number of print sheets is equal to or greater than the maximum number of sheets for warm up printing N, the process proceeds to S414 (S409).

In the controller unit 1300, the chart accuracy determination unit 1370 compares the maximum value among the standard deviations of the lightness values of respective patches stored in the storage unit 1330 with the second threshold value, and in a case where the standard deviation is less than the second threshold value, the process proceeds to S411, otherwise the process proceeds to S412 (S410).

In a case where the maximum value among the standard deviations of the lightness values of respective patches is less than the second threshold value in S410, the process then returns to S402 and the chart accuracy determination unit 1370 sets the number of adjustment charts to be printed to half the number of print sheets set in S401 to store the setting in the storage unit 1330 (S411).

On the other hand, in a case where the standard deviation is equal to or greater than the second threshold value in S410, the chart accuracy determination unit 1370 sets the number of next adjustment chart print sheets to the same value as the number of adjustment chart print sheets set by the user in S401 to store the setting in the storage unit 1330 (S412).

The controller unit 1300 notifies the user via the operation unit 1380 that since the standard deviation of the lightness value of each patch is not within the first threshold value, the adjustment chart 2000 is printed again. In a case where the controller unit 1300 confirms that the user presses a reprint start button in the operation unit 1380, the controller unit 1300 transmits the number of adjustment chart print sheets stored in the storage unit 1330 and the print start instruction via the printer I/F 1340 to the image forming unit 1340, and the process returns to S402 (S413).

<Processing in a Case where the Standard Deviation of Patch Lightness is not Less than the First Threshold Value for the Maximum Number of Sheets for Warm Up Printing N>

In S409, in a case where the number of print sheets of the adjustment chart 2000 is equal to or greater than the maximum number of sheets for warm up printing N, it is considered that there is an issue that the state of the machine body and operation conditions of the image forming apparatus 1000 are not stable even in a case where the warm up printing is further repeated. In this case, the control unit 1300 notifies the user via the operation unit 1380 that the adjustment chart 2000 with sufficient accuracy cannot be obtained even in a case where the number of print sheets reaches the predetermined number of print sheets or more to finish printing the adjustment chart 2000 (S414).

FIGS. 5A to 5E show examples of a screen at the time of receiving a user input and at the time of notifying the user in the operation unit 1380 described in the above printing flow of the adjustment chart 2000.

Figure 5A:
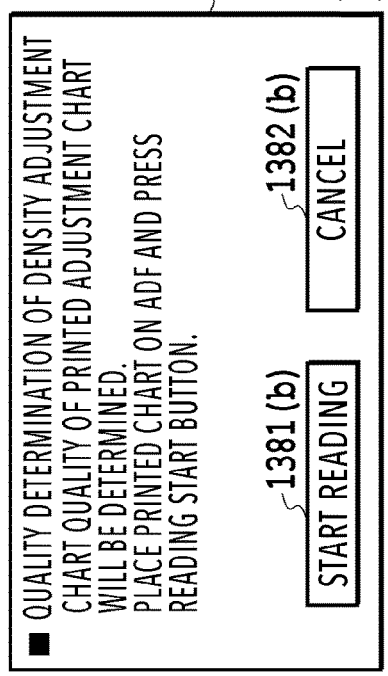
FIG. 5A is a UI display example of an operation unit 1380 of the image forming apparatus according to the present embodiment.

1380(*a*) in FIG. 5A is an example of a display screen of the operation unit 1380 in S401. In starting printing of the adjustment chart 2000, the user can designate the number of print sheets of the adjustment chart 2000 including warm up printing by providing input with up and down buttons or the hardware key as shown in 1381(*a*). In a case where the user designates the number of print sheets and presses a print start button 1832(*a*), the controller unit 1300 stores, in the storage unit 1330, the number of print sheets of the designated chart displayed in the column of 1381(*a*) to start print processing of the adjustment chart 2000.

Figure 5B:
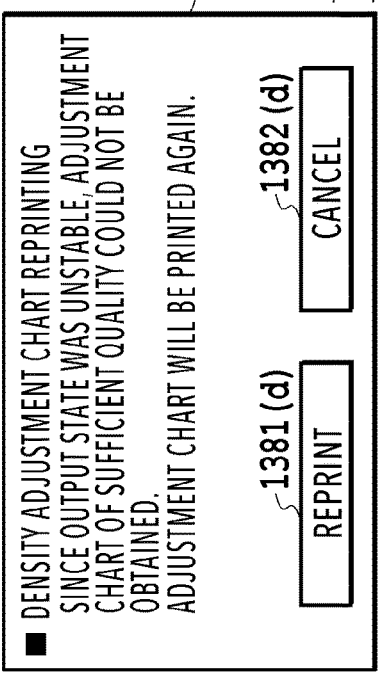
FIG. 5B is a UI display example of the operation unit 1380 of the image forming apparatus according to the present embodiment.

1380(*b*) in FIG. 5B is an example of a display screen of the operation unit 1380 in S403. In reading the printed material of the adjustment chart 2000, the user first places all the printed materials of the adjustment chart 2000 discharged from the image forming unit 1400 on the ADF 1100. In a case where the printed materials are placed on the ADF 1100, the controller unit 1300 displays a reading start button 1381(*b*) on the operation unit 1380 to wait for the user to press the reading start button 1381(*b*). In a case where the reading start button 1381(*b*) is pressed, the controller unit 1300 transmits an image reading instruction to the ADF 1100 and the image reading unit 1200 via the scanner I/F 1350.

Figure 5C:
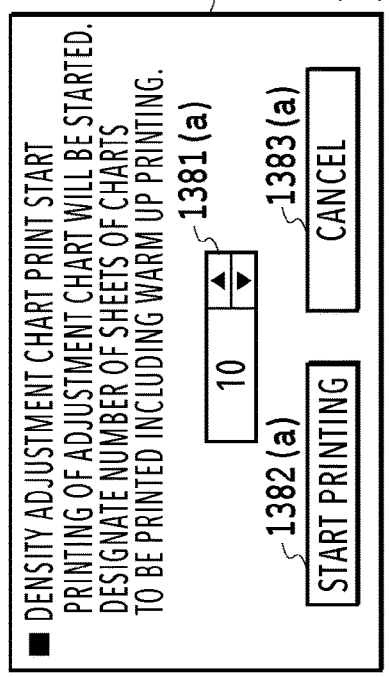
FIG. 5C is a UI display example of the operation unit 1380 of the image forming apparatus according to the present embodiment.

1380(*c*) in FIG. 5C is an example of a display screen of the operation unit 1380 in S409. In a case where the standard deviation of a specific patch lightness of the adjustment chart 2000 is less than the first threshold value, the controller unit 1300 displays the number of printed materials of the adjustment chart 2000 actually printed at the end of this printing of the adjustment chart 2000 as shown in 1380(*c*). Further, the controller unit 1300 displays the number of print sheets on the operation unit 1380 as the required number of sheets for warm up printing in a case where the standard deviation of the lightness value of a specific patch is less than the first threshold value for the first time. As a result, the user can know, as a reference, how many print sheets tend to be required in a case where the image forming apparatus 1000 performs warm up printing using the adjustment chart 2000.

Further, the required number of sheets for warm up printing may be stored in association with the image used for the warm up printing, and in starting the warm up printing in which the same image is used, the required number of sheets for warm up printing may be displayed depending on the state of the machine body at that time, for example, in a case where a certain period of time has passed since the machine body stops.

Figure 5D:
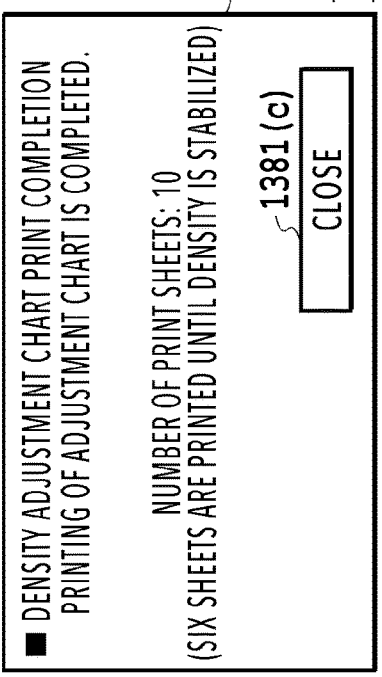
FIG. 5D is a UI display example of the operation unit 1380 of the image forming apparatus according to the present embodiment.

1380(*d*) in FIG. 5D is an example of a display screen of the operation unit 1380 in S417. In a case where the standard deviation of the lightness value of at least one patch in the adjustment chart 2000 exceeds the first threshold value while the number of print sheets is less than the maximum number of sheets for warm up printing N, the same printing is performed again. At this time, the controller unit 1300 displays an indication on the operation unit 1380 that the adjustment chart 2000 is to be printed again as shown in 1380(*d*). In a case where the controller unit 1300 receives the input of a reprint button as shown in 1381(*d*) from the user, the controller unit 1300 transmits a print start instruction to the image forming unit 1400 via the printer I/F 1340.

Figure 5E:
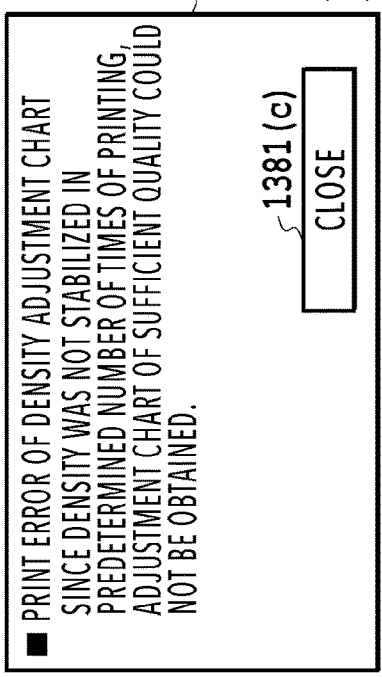
FIG. 5E is a UI display example of the operation unit 1380 of the image forming apparatus according to the present embodiment.

1380(*e*) in FIG. 5E is an example of a display screen of the operation unit 1380 in S414. In a case where the number of print sheets is equal to or greater than the maximum number of sheets for warm up printing and the standard deviations of the lightness values of all patches are not less than the first threshold value, the controller unit 1300 displays the occurrence of a print error of the adjustment chart 2000 as shown in 1380(*e*). The controller unit 1300 waits for the user to press a close button of 1381(*e*) to end the print processing of the adjustment chart 2000.

Although omitted in the basic flowchart in FIG. 4, a cancel button such as 1383(*a*), 1382(*b*), and 1382(*d*) may be prepared, and in a case where the user presses the cancel button, the controller unit 1300 may end the print processing of an adjustment chart.

As described above, the image forming apparatus 1000 according to the present embodiment calculates the standard deviation of the lightness of a specific patch based on image data obtained by reading the printed material of the adjustment chart 2000 output by the image forming apparatus 1000. Then, the printing of the adjustment chart 2000 is repeated until the calculated standard deviation is sufficiently reduced. Therefore, the adjustment chart 2000 after the state of the machine body of the image forming apparatus 1000 is stabilized can be used for an actual adjustment, and it is possible to reduce unnecessary warm up printing after the adjustment chart 2000 having accuracy enough to be used for the density adjustment is obtained.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

According to the present disclosure, an image forming apparatus can be controlled depending on whether the image forming apparatus is in a stable state capable of high-quality printing.

This application claims the benefit of Japanese Patent Application No. 2020-128060 filed Jul. 29, 2020, which is hereby incorporated by reference wherein in its entirety.

What is claimed is:

1. An apparatus comprising:
   at least one processor; and
   a memory coupled to the processor storing instructions that, when executed by the processor, cause the processor to function as:
   a forming unit configured to output a first number of printed materials on which an image for performing a density adjustment is formed;
   a reading unit configured to read the first number of printed materials output from the forming unit to acquire the first number of pieces of scanned image data, the first number being two or more; and
   a control unit configured to control the forming unit by calculating, for each scanned image data group having as a unit a second number of pieces of scanned image data consecutive in order of being read among the first number of pieces of scanned image data, variations in lightness values of a predetermined number of specific pixels in the respective pieces of scanned image data included in each scanned image data group, the second number being two or more, so that the printed materials are further output until all the variations in the lightness values of the predetermined number of specific pixels are less than a first threshold value,
   wherein in a case where the number of the output printed materials is equal to or greater than a predetermined number, the control unit controls the forming unit so as to end outputting of the printed materials even in a case where the variations are equal to or greater than the first threshold value.

2. The apparatus according to claim 1, wherein
   the control unit controls the forming unit so that half the first number of printed materials are further output in a case where all the variations calculated based on the scanned image data group including scanned image data read most recently of the first number of pieces of scanned image data are equal to or greater than the first threshold value and at least one of the variations is less than a second threshold value which is greater than the first threshold value.

3. The apparatus according to claim 2, wherein the control unit controls the forming unit so that the first number of printed materials are further output in a case where all the variations calculated based on the scanned image data group including scanned image data read most recently of the first number of pieces of scanned image data are equal to or greater than the second threshold value.

4. The apparatus according to claim 1, wherein the control unit causes a display device to display as a required number of sheets for warm up printing a minimum value among maximum values representing order in which scanned image data included in the scanned image data group in which all the variations are less than the first threshold value is read.

5. The apparatus according to claim 1, wherein an image for performing the density adjustment is an image in which at least one color is arranged in a plurality of different positions at different densities, and the control unit calculates the variations using as the specific pixel a plurality of pixels of the scanned image data corresponding to the plurality of different positions of the image for performing the density adjustment.

6. The apparatus according to claim 1, wherein the variations are a standard deviation.

7. The apparatus according to claim 1, further comprising an operation unit that allows a user to set the first number and the second number.

8. A method comprising:
outputting a first number of printed materials on which an image for performing a density adjustment is formed;
reading the first number of printed materials to acquire the first number of pieces of scanned image data, the first number being two or more; and
calculating variations in lightness values of a predetermined number of specific pixels in the respective pieces of scanned image data included in scanned image data groups for each scanned image data group having as a unit a second number of pieces of scanned image data consecutive in order of being read among the first number of pieces of scanned image data, the second number being two or more, so as to cause the apparatus to further output the printed materials until all the variations in the lightness values of the predetermined number of specific pixels are less than a first threshold value, and
controlling, in a case where the number of the output printed materials is equal to or greater than a predetermined number, so as to end outputting of the printed materials even in a case where the variations are equal to or greater than the first threshold value.

9. The method according to claim 8, further comprising displaying as a required number of sheets for warm up printing a minimum value among maximum values representing order in which scanned image data included in the scanned image data group in which all the variations are less than the first threshold value is read.

10. The method according to claim 8, wherein an image for performing the density adjustment is an image in which at least one color is arranged in a plurality of different positions at different densities, and the calculating calculates the variations using as the specific pixel a plurality of pixels of the scanned image data corresponding to the plurality of different positions of the image for performing the density adjustment.

11. The method according to claim 8, wherein the variations are a standard deviation.

12. The method according to claim 8, further comprising allowing a user to set the first number and the second number.

13. A non-transitory computer readable storage medium storing a program which causes a computer to execute a method comprising:
outputting a first number of printed materials on which an image for performing a density adjustment is formed;
reading the first number of printed materials to acquire the first number of pieces of scanned image data, the first number being two or more;
calculating variations in lightness values of a predetermined number of specific pixels in the respective pieces of scanned image data included in scanned image data groups for each scanned image data group having as a unit a second number of pieces of scanned image data consecutive in order of being read among the first number of pieces of scanned image data, the second number being two or more, so as to cause the apparatus to further output the printed materials until all the variations in the lightness values of the predetermined number of specific pixels are less than a first threshold value; and
comprising controlling, in a case where the number of the output printed materials is equal to or greater than a predetermined number, so as to end outputting of the printed materials even in a case where the variations are equal to or greater than the first threshold value.

14. The non-transitory computer readable storage medium according to claim 13, further comprising displaying as a required number of sheets for warm up printing a minimum value among maximum values representing order in which scanned image data included in the scanned image data group in which all the variations are less than the first threshold value is read.

15. The non-transitory computer readable storage medium according to claim 13,
wherein an image for performing the density adjustment is an image in which at least one color is arranged in a plurality of different positions at different densities, and
wherein the calculating calculates the variations using as the specific pixel a plurality of pixels of the scanned image data corresponding to the plurality of different positions of the image for performing the density adjustment.

16. The non-transitory computer readable storage medium according to claim 13, wherein the variations are a standard deviation.

17. The non-transitory computer readable storage medium according to claim 13, further comprising allowing a user to set the first number and the second number.

* * * * *